R. C. BERRY.
BAND SAW.
APPLICATION FILED MAY 7, 1917. RENEWED MAY 3, 1918.

1,287,193.

Patented Dec. 10, 1918.
2 SHEETS—SHEET 1.

Witness
Frank A. Fahle

Inventor
Robert C. Berry,

By

Attorneys

R. C. BERRY.
BAND SAW.
APPLICATION FILED MAY 7, 1917. RENEWED MAY 3, 1918.

Patented Dec. 10, 1918.
2 SHEETS—SHEET 2.

Witness
Frank A. Fahle

Inventor
Robert C. Berry,
By
Hood & Schley.
Attorneys

UNITED STATES PATENT OFFICE.

ROBERT C. BERRY, OF INDIANAPOLIS, INDIANA.

BAND-SAW.

1,287,193.  Specification of Letters Patent.  Patented Dec. 10, 1918.

Application filed May 7, 1917, Serial No. 166,801. Renewed May 3, 1918. Serial No. 232,380.

*To all whom it may concern:*

Be it known that I, ROBERT C. BERRY, a citizen of the United States, residing at Indianapolis, in the county of Marion and State of Indiana, have invented a new and useful Band-Saw, of which the following is a specification.

It is the object of my invention to provide a simple and convenient machine saw construction, especially for band saws, wherein the saw is mounted on a swinging frame but the cutting portion of the saw is compelled to travel in a straight line and to lie at all times in a given plane as the frame swings to carry the saw across the work.

Figure 1:
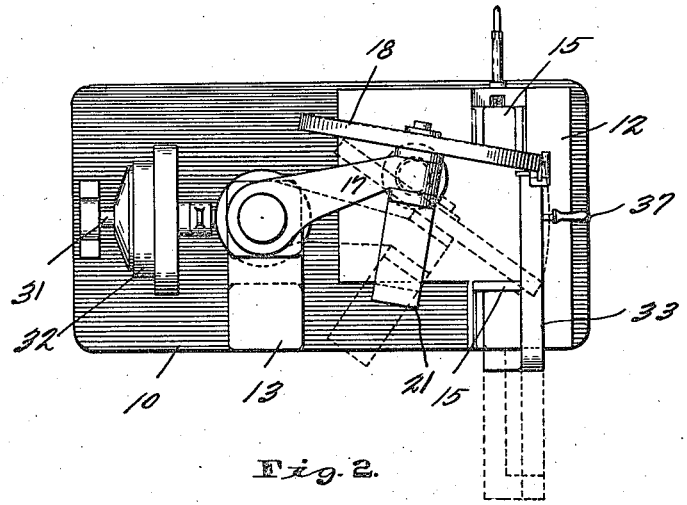
Figure 2:
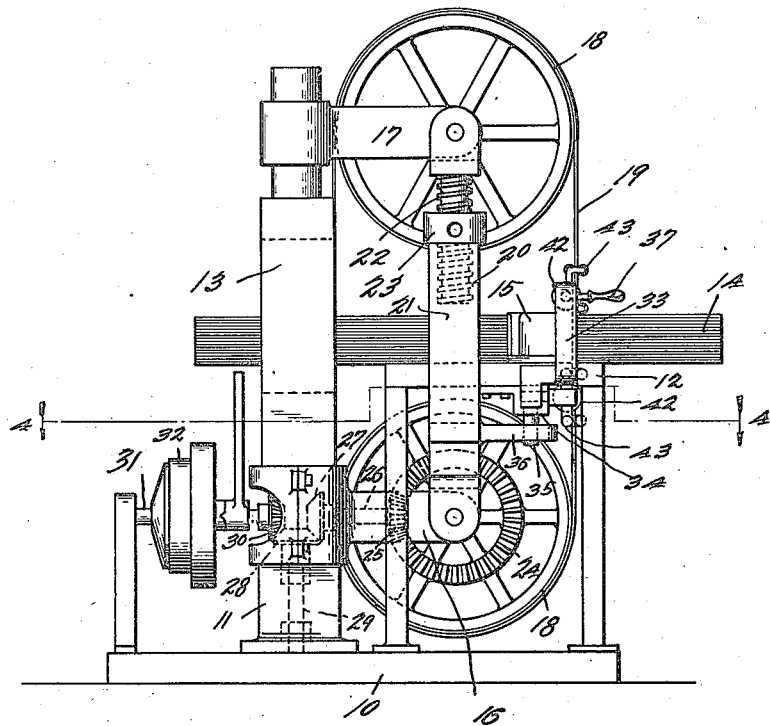
Figure 3:
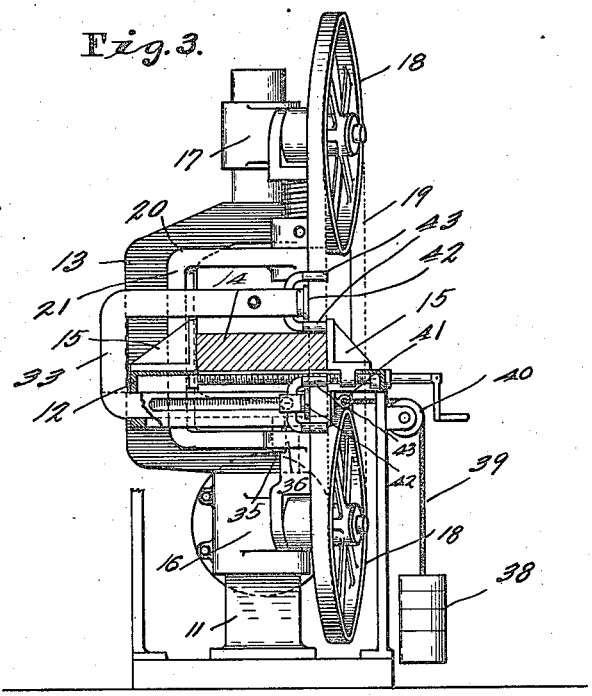
Figure 4:
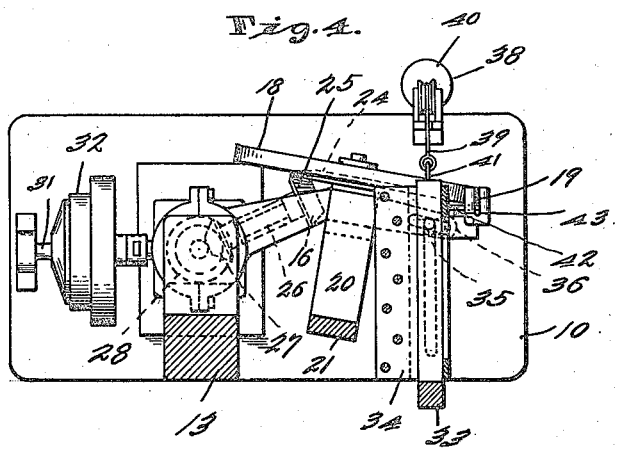

The accompanying drawings illustrate my invention. Figure 1 is a plan of a saw embodying my invention; Fig. 2 is a side elevation thereof; Fig. 3 is a front elevation thereof; and Fig. 4 is a section on the line 4—4 of Fig. 2.

Mounted on the base 10 is an upright post 11 and a work-supporting table 12, the post 11 being provided with a laterally offset portion 13 in and above the plane of the table 12, as is clear from Fig. 3, so as not to interfere with the bar 14 to be sawed, which bar is clamped in place on the table 12 between suitable vise jaws 15. Mounted on the post 11 so as to turn about a common vertical axis are a lower arm 16 and an upper arm 17, on which are mounted in suitable bearings the two saw-carrying wheels 18 on which is mounted the band saw 19. The free ends of the arms 16 and 17 are connected by an extensible strut 20, also provided with an offset portion 21 (see Fig. 3) so that it will not interfere with the bar 14 to be sawed, which strut is variable in length by the screw 22 and nut 23 to produce proper tension on the saw 19, the upper arm 17 sliding vertically upon such adjustment. By reason of the strut 20, the arms 16 and 17 swing as a unit, the offset portion 21 spanning the table 12 and bar 14 to be sawed. The lower saw-carrying wheel 18 has a bevel gear 24 which meshes with a bevel pinion 25 on a shaft 26 mounted in suitable bearings in the arm 16, which shaft 26 is connected through bevel gears 27 and 28 to a vertical shaft 29 in the axis on which the arms 16 and 17 swing, so that a driving connection from the shaft 29 to the saw is provided at all times while still permitting the swinging of the arms 16 and 17. The shaft 29 may be driven in any suitable manner, as by a bevel gear 30 meshing with the bevel gear 28 and mounted on a shaft 31 provided with a suitable driving pulley and clutch 32.

In order to guide the working portion of the saw 19 in a straight line, there is provided a U-shaped guide 33 which extends around the edge of the work-carrying table 12 and the bar 14 to be sawed, as is clear from Fig. 3. This U-shaped member 33 and the offsets 13 and 21 all preferably extend over and under the edge of the bar 14 to be sawed from the same side. The U-shaped guide 33 is mounted in guide-ways 34 on the under face of the work-carrying table 12, so that it travels in a straight line across the bar 14. A pin 35 projecting downward from the under arm of the U-shaped member 33 through a slot in the guide-way 34 coöperates with a slot in the end of an arm 36 projecting outward from the strut 20, so that the arms 16 and 17 swing as the guide 33 slides in its guide-ways. The guide 33 is provided with an operating handle 37 whereby it may be moved manually in either direction; but I prefer in ordinary operation to move this guide manually only backward; or to the left in Fig. 3, and to feed it automatically on its cutting stroke, or to the right in Fig. 3, as by a weight 38 connected by a rope or cable 39 passing over a pulley 40 to an eye 41 on the free end of the lower arm of the U-shaped guide 33. Rotatably mounted on each free end of the U-shaped guide 33 is a disk 42 for bearing against the back edge of the saw 19 to take the thrust, and two pairs of guide rollers 43, one pair above and one pair below such disk 42, for bearing against the sides of the saw and holding that portion of it between the two disks 42 always in the same vertical plane, regardless of the position of the arms 16 and 17.

In operation, the arms 16 and 17 are swung in a clockwise direction and the guide 33 is moved by the handle 37, so that they take the positions indicated in dotted lines in Fig. 1. Then the bar 14 to be sawed is put in place on the table 12 and clamped there by the vise jaws 15. Then, the clutch 32 being set so that the saw 19 is driven, the weight 38 is allowed to move the arms 16 and 17 and the guide 33 from the position shown in dotted lines toward the position shown in full lines in Fig. 1. During this movement, the saw 19 saws through the bar 14. The rate of sawing can be varied by varying the size of the weight 38. During this movement, the arms 16 and 17 and the saw-carrying wheels 18 travel in circular arcs, and the larger portion of the saw 19 likewise travels horizontally in circular arcs; but that portion of the saw 19 which is between the two disks 42 is guided in a straight line of travel so that it is always in the same vertical plane, by reason of the guide rollers 43, the band saw having sufficient flexibility to permit this.

I claim as my invention:

1. A band saw, comprising a main supporting post, a frame mounted to swing thereon on a vertical axis, upper and lower wheels mounted on said swinging frame for supporting a band saw, a rectilinearly sliding frame provided with means for holding in a given plane a portion of the band saw carried by such wheels as such swinging frame moves, and a connection between said two frames whereby they move together.

2. A band saw, comprising a main supporting post, a frame mounted to swing thereon on a vertical axis, upper and lower wheels mounted on said swinging frame for supporting a band saw, and means for holding in a given plane as the frame swings the cutting portion of the saw carried by such wheels.

3. A band saw, comprising a main supporting post, a frame mounted to swing thereon on a vertical axis, upper and lower wheels mounted on said swinging frame for supporting a band saw, a rectilinearly sliding frame provided with means for holding in a given plane a portion of the band saw carried by such wheels as such swinging frame moves, a connection between said two frames whereby they move together, and means for automatically feeding said frames in the direction to produce sawing.

4. A band saw, comprising a main supporting post, a frame mounted to swing thereon on a vertical axis, upper and lower wheels mounted on said swinging frame for supporting a band saw, means for holding in a given plane as the frame swings the cutting portion of the saw carried by such wheels, and means for automatically feeding said frame in the direction to produce sawing.

5. A band saw, comprising a main supporting post, a frame mounted to swing thereon on a vertical axis, upper and lower wheels mounted on said swinging frame for supporting a band saw, a vertical shaft mounted in said post on the axis on which said swinging frame swings, a shaft mounted in said swinging frame and having a driving connection with one of said wheels, and bevel gearing connecting said two shafts.

6. A band saw, comprising a main supporting post, a frame mounted to swing thereon on a vertical axis, and upper and lower wheels mounted on said swinging frame for supporting a band saw, said swinging frame having a portion offset parallelly to the cutting plane of the band saw in the horizontal plane of the work to be sawed so that it does not interfere therewith.

7. A band saw, comprising a main supporting post, a frame mounted to swing thereon on a vertical axis, upper and lower wheels mounted on said swinging frame for supporting a band saw, a rectilinearly sliding frame provided with means for holding in a given plane a portion of the band saw carried by such wheels as such swinging frame moves, and a connection between said two frames whereby they move together, said swinging frame and said sliding frame each having portions respectively over and under the work to be sawed and a third portion connecting said first two portions but located outside the vertical plane of such work.

8. A band saw, comprising a main supporting post, a frame mounted to swing thereon on a vertical axis, upper and lower wheels mounted on said swinging frame for supporting a band saw, a rectilinearly sliding frame provided with means for holding in a given plane a portion of the band saw carried by such wheels as such swinging frame moves and with thrust disks for taking the thrust of the saw, and a connection between said two frames whereby they move together.

9. A machine saw, comprising a main supporting post, a frame mounted to swing thereon on a vertical axis, means for supporting a saw on said swinging frame so that its cutting portion moves vertically, and means for compelling the cutting portion of said saw to travel in a given plane as said frame swings.

In witness whereof, I have hereunto set my hand at Indianapolis, Indiana, this third day of May, A. D. one thousand nine hundred and seventeen.

ROBERT C. BERRY.